__United States Patent Office__

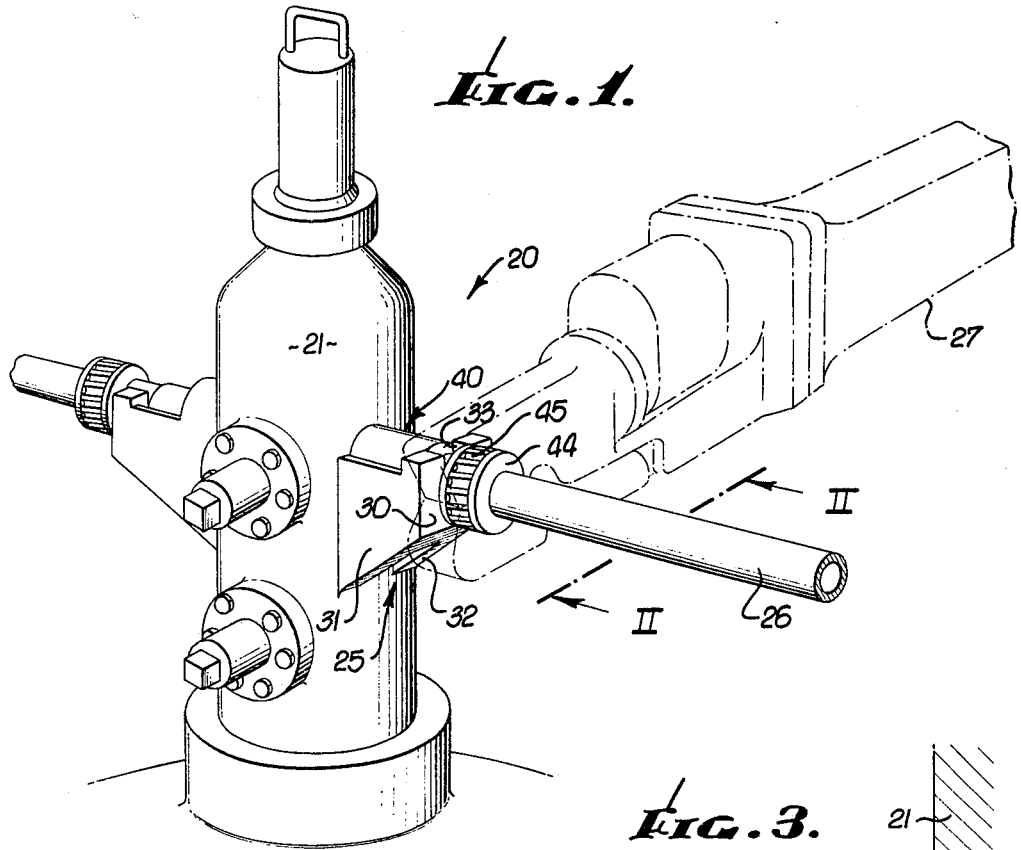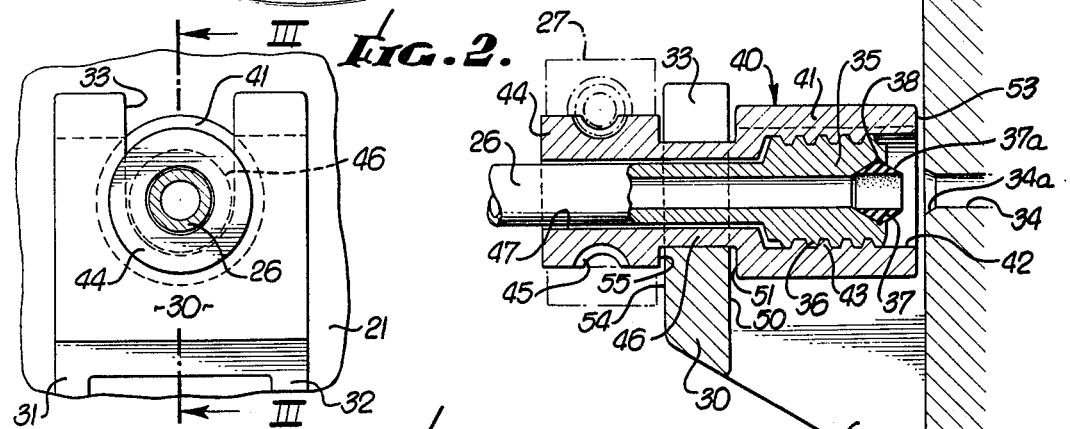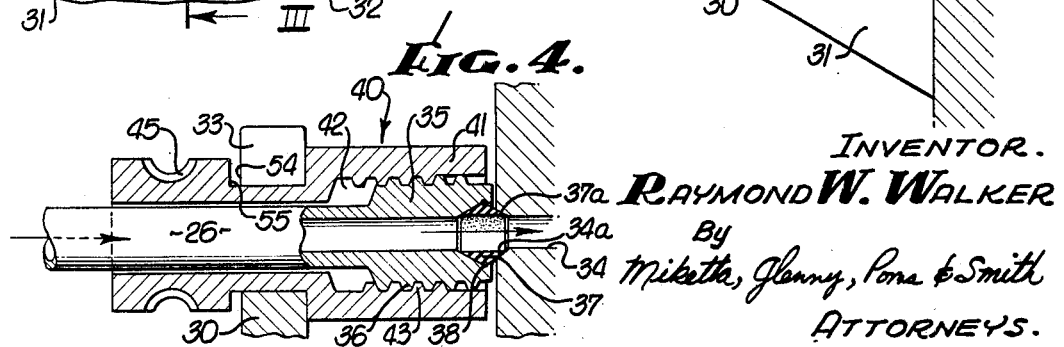

3,502,354
Patented Mar. 24, 1970

3,502,354
WELLHEAD PIPE CONNECTOR MEANS
Raymond W. Walker, Huntington Beach, Calif., assignor to Deep Oil Technology, Inc., Long Beach, Calif., a corporation of California
Filed July 3, 1968, Ser. No. 742,435
Int. Cl. F16l 37/26, 19/02, 17/00
U.S. Cl. 285—24                                    11 Claims

ABSTRACT OF THE DISCLOSURE

A wellhead pipe connector means for securing a pipe, conduit, or the like, to a subsea wellhead having an opening so as to provide a sealed flow passageway from the wellhead to the pipe. The connector means includes a support and alignment member mounted on the wellhead including an abutment wall spaced from the wellhead opening and having a U-shaped opening for supporting a rotatable collar in which the pipe is received. The collar has internal threads engaging a threaded member secured to the end of the pipe and has a reduced outer diameter portion for reception in the U-shaped opening so as to constrain the collar from axial movement relative to the wellhead when rotated so as to move the pipe into and out of sealing engagement with the wellhead.

In the oil well industry, the most common types of wellhead pipe connectors employ threads on the pipe for engaging threads in the wellhead opening, a flange on the end of the pipe which may be bolted to a mating flange on the wellhead casing, or by using some type of clamp. The difficulty with the prior art connectors is that they involve complex and time-consuming handling and assembly techniques to complete the connection which is particularly disadvantageous when remotely operated assembly equipment must be used. Difficulty in assembly becomes particularly acute for underwater connector means used in offshore subsea drilling operations.

Generally, the present invention provides a wellhead pipe connector means for securing a pipe to the wellhead to provide a flow tight connection between the wellhead and pipe, including an outwardly extending support mounted on the wellhead having a wall laterally spaced from the wellhead with a U-shaped opening in registry with the wellhead opening, an externally threaded member secured to the end of the pipe, and internally threaded collar engaging the externally threaded member and having an outer surface with a reduced diameter portion received in the U-shaped opening to constrain axial movement of the collar when rotated whereby the pipe is moved axially toward and away from the wellhead so as to selectively sealingly engage the end of the pipe with the wellhead to form a sealed flow connection.

An object of the present invention is to provide a wellhead pipe connector for securing a pipe to a wellhead having an opening in which the end of the pipe is supported in aligned relation with the wellhead opening, without any external support, prior to connection of the pipe to the casing, eliminating the need for manual support and alignment.

It is another object of the present invention to provide a wellhead pipe connector for a pipe and a wellhead having an opening, which is simple in construction and involves a simple operation for connection.

Still aother object of the present invention is to provide a wellhead pipe connector for providing a sealed flow connection between a pipe and a wellhead having an opening, which is adapted for use with remotely operated assembly equipment.

A further object of the present invention is to disclose and provide a wellhead connector means wherein a wellhead is provided with a fixed support and alignment means and a pipe is provided with a connectod fitting cooperable with said alignment means to readily position and align the pipe with an opening in the case.

Still another object of the present invention is to disclose and provide a connector fitting including spaced end portions adapted to be assembled with a pipe, one of said end portions having means for rotating said connector fitting and the other end having means for translating such rotary movement to axial movement of the pipe.

Other objects and advantages of this invention will be readily apparent from the following description when considered in connection with the appended drawings.

In the drawings:
FIG. 1 is a perspective view of a wellhead pipe connector shown in conjunction with a wellhead and pipe and illustrating in phantom lines a tool for use in performing the connection;
FIG. 2 is a partial end view taken along the plane II—II of FIG. 1;
FIG. 3 is a sectional view taken along the vertical plane III—III of FIG. 2; and
FIG. 4 is a sectional view similar to that of FIG. 3 showing the pipe in sealing connection with the wellhead opening.

Referring now to the drawing, there is shown in FIG. 1, a wellhead 20 including the upper portion of the wellhead 21. There is also shown an exemplary embodiment of a wellhead pipe connector means indicated generally at 25, for securing a pipe 26 to wellhead 20. Wellhead 20 may be of the type commonly used in subsea producing operations and pipe 26 may be a standard subsea production oil line. A power wrench indicated generally at 27 and which is described more fully in an application filed concurrently herewith, is provided for performing the connection between the pipe 26 and wellhead 20.

Exemplary wellhead pipe connector 25 includes pipe supporting and alignment means comprising a bracket having an abutment wall 30 supported in horizontally spaced apart relation to the wellhead 21 by means of tension arms or members 31, 32. Wall 30 is provided with an upwardly facing U-shaped opening 33 which is in axial alignment with a flow passage or port 34 in wellhead 21. Port 34 is provided with a tapered or flared seat 34a cooperable with seal member 37 as hereafter described. While the pipe supporting means, illustrated in the drawing, is integral with the wellhead, it will be understood that such means may be removably secured to the wellhead.

The wellhead pipe connector means may also include cylindrical externally threaded means comprising an enlarged diameter cylindrical member 35 non-rotationally secured to or integral with the end of pipe 26. Cylindrical member 35 is provided with external heavy-duty threads 36, such as Acme standard threads or the like. The forward end of cylindrical member 35 is provided with a resilient ported seal member 37 secured to cylindrical member 35 by a suitable retaining element 38. In this example seal member 37 may be triangular in cross-section to present a tapered seal face 37a to be partially received in port 34 for sealing engagement against seat 34a. Seal face 37a extends beyond the end of member 35. While cylindrical member 35 is illustrated as unitary with pipe 26, it will be understood that member 35 may be secured to the end of a standard pipe 26 by welding or the like.

Wellhead pipe connector means 25 may also include a generally cylindrical collar indicated at 40. Collar 40 has an enlarged forward end portion 41 providing a cylindrical chamber 42 with internal threads 43 for threadedly engaging the threads 36 on cylindrical member 35. As will be seen in FIG. 3, the axial length of cylindrical chamber 42 is such that the collar 40 may be threaded forwardly on the cylindrical member 35 so that the forward edge of seal 37 is retracted within chamber 42 preventing damage to the seal when the pipe and collar are being positioned and arranged for connection with the wellhead.

Collar 40 also includes a rear end portion 44 providing means for rotating the collar, which in the exemplary embodiment comprises helical threads 45. Collar 40 also includes an intermediate portion 46 of reduced diameter relative to the diameters of forward portion 41 and rear portion 44 and which is adapted to be rotatably received in U-shaped opening 33. Portions 44 and 46 are provided with a bore 47 which slidably receives pipe 26.

In connecting pipe 26 in flow tight communication to the wellhead 34, the collar 40 is sleeved over pipe 26 and is threadedly engaged on cylindrical member 35. The reduced diameter or neck portion 46 of collar 40 is lowered into the U-shaped opening 33 of the pipe supporting and alignment means. The jaws of power wrench 27 are then closed about helically threaded rear end portion 44 so that a helical worm gear carried by one of the jaws will engage helical threads 45 on collar 40. Operation of power wrench 27 will rotate collar 40 which is restrained against axial movement by abutment faces 50 and 51 on wall 30 and the outer end of portion 41 respectively, thereby advancing pipe 26 and cylindrical member 35 so that the seal 37 will enter and be tightly pressed against seat 34a to provide a sealed flow passageway between pipe 26 and the wellhead 20. In such pressure sealing engagement between seat 34a and face 37a, the arms 31, 32 are placed in tension.

Inner edge face 53 is spaced from the surface of the wellhead to provide loose tolerance so that portion 41 may be readily received between the casing wellhead and abutment wall 30. Portion 41 serves to initially longitudinally position collar 40 longitudinally relative to the wellhead by referencing face 53 on the wellhead during lowering of the collar. In addition walls 30, 31 and 32 define a vertical through opening which prevents the accumulation of foreign matter about port 34 and which provides an unobstructed space for reception and operation of collar 40.

Rotation of collar 40 in the opposite direction for breaking the flow tight connection between pipe 26 and casing 21 will cause abutment of outer face 54 of wall 30 with inner face 55 of end portion 44 so that axial movement of collar 40 is restrained to permit backing off of seal member 37 from seat 34a.

It will thus be apparent that the collar 40 may be assembled with pipe 26 prior to lowering pipe 26 into the water and with the threaded end of the pipe provides a connector fitting readily actuated and rotatably driven to provide a connection to body provided with an opening and a fixed support for the fitting. When pipe 26 with collar 40 thereon is lowered into the opening in wall 30, the abutment faces 50, 51, 54 and 55 coact to hold pipe 26 in approximate axial alignment with port 34. Axial misalignment is limited to tolerances between said faces; the tapered seal member assuring entrance of the seal member into the seal seat of port 34.

It will therefore be seen that the above-mentioned objects are satisfied by the present wellhead pipe connector which requires minimum manipulation to perform the connection. Moreover, it will be seen that the end of the pipe 26 is supported and aligned, prior to connection, making it possible for a remotely operated robot tool to simply and effectively secure the connection.

Obviously, many modifications and variations of the present invention are possible in light of the above teachings.

I claim:

1. A connector means for securing a pipe to a wellhead to provide a sealed flow passage between the pipe and an opening in the wellhead comprising:

pipe supporting and alignment means mounted on the wellhead adjacent the wellhead opening and including a wall laterally spaced from the wellhead and having a U-shaped opening aligned with the wellhead opening;

externally threaded means secured to the end of the pipe;

seal means for said wellhead opening;

a generally cylindrical collar for receiving the pipe and said cylindrical externally threaded means and having an internally threaded end portion engaging said cylindrical externally threaded means and extending between said wall and wellhead;

means for rotating said collar mounted on the other end portion thereof, an intermediate neck portion on said collar having an outer diameter less than the outer diameter of the end portions of said collar, said intermediate neck portion being loosely rotatably received in said U-shaped opening so as to permit initial assembly of said collar in said U-shaped opening in out of axial alignment condition and surface means extending between said intermediate portion and said end portions constraining said collar by abutment against said wall against axial movement relative to the wellhead, whereby said collar may be rotated through said rotating means to axially move the pipe and cylindrical externally threaded means toward and away from the wellhead opening to selectively sealingly engage the pipe in flow tight relation with the wellhead opening.

2. The connector of claim 1 wherein said seal means includes a sealing ring carried by and extending beyond the end of said pipe for sealing engagement with the wellhead opening and the pipe end.

3. A connector means for securing a pipe to a wellhead to provide a sealed flow passageway between the pipe and an opening in the wellhead, comprising:

a pipe supporting and alignment bracket mounted on the wellhead adjacent the wellhead opening including a wall laterally spaced from the wellhead and having a U-shaped opening aligned with the wellhead opening;

a cylindrical externally threaded member fixedly mounted on the end of the pipe;

seal means for said pipe end and said wellhead opening; and a cylindrical collar having an axially extending chamber, one end of said chamber being enlarged and internally threaded and engaging said cylindrical externally threaded member, the other end of said chamber being of a reduced diameter for receiving the pipe, said collar having rotating means integrally mounted on said other end portion, said collar having an external intermediate portion with a diameter less than the outer diameter of said end portions and rotatably received in said U-shaped opening so as to constrain said collar by said wall against axial movement relative to said wellhead, whereby rotation of said collar axially moves the pipe and cylindrical externally threaded member toward and away from the wellhead opening and compressing and relieving pressure on said seal means.

4. The connector of claim 3 wherein said cylindrical externally threaded member carries said seal means which includes a resilient sealing ring extending beyond the end thereof for sealing the wellhead opening.

5. The connector of claim 4 wherein the axial length of said collar enlarged diameter chamber is greater than the axial length of said cylindrical externally threaded member, whereby the sealing ring may be withdrawn within the collar to prevent damage thereto prior to making the connection.

6. A connecting means for joining a pipe end with a body having an opening for fluid communication with said pipe end, comprising in combination:
- a connector support means including spaced outwardly extending tension members carried on said body on opposite sides of the outward projection of the axis of said opening,
- a positioning and abutment wall transverse to said axis spaced from said body and connected with said tension members and including means for positioning and aligning a pipe end with said opening by movement of said pipe end laterally of said axis;
- and a connector fitting carried by said pipe end and movable laterally into cooperable engagement with said positioning means and comprising
- a normally non-rotatable externally threaded portion at said pipe end,
- a rotatable member having internal threads engaging the external threaded portion,
- and having a rotatable portion extending between said body and abutment wall for longitudinally positioning said connector fitting relative to said body and abutment wall,
- said rotatable member having means cooperable with said abutment wall for restraining longitudinal movement of the rotatable means whereby, upon rotation of said rotatable member, the pipe end is axially moved into and out of sealed communication with said opening.

7. A connecting means as stated in claim 6 wherein said connector fitting includes a seal member within said rotatable portion and said body includes a recessed seal seat.

8. A connector means as stated in claim 6 wherein said tension members define a through opening for reception of said rotatable member.

9. A connector means as stated in claim 7 wherein said rotatable portion includes a skirt extending beyond the end of said threaded portion on said pipe end for protecting said seal and threaded end portion in non-installed positions of said connector fitting.

10. A connector means for use with subsea wellhead including, in combination:
- a wellhead body having an opening;
- a connector positioning means carried by said body and defining a space opposite said opening;
- a collar means provided with a through bore and adapted to be sleeved over a pipe;
- said collar means including spaced portions and a neck portion connecting said spaced portions,
- one of said spaced portions having threads adapted to engage threads on a pipe to be moved axially into sealing engagement with the opening in the wellhead body,
- said one spaced portion being receivable in said space opposite said opening and having an end face longitudinally locating said collar means relative to said body and connector positioning means,
- the other of said spaced portions having threads adapted to provide a driving connector with an actuator means,
- said neck portion providing faces adapted to cooperate with said connector positioning means for holding said collar means against axial movement.

11. A connector fitting for a pipe end for facilitating making a flow tight connection to a body having an opening under unfavorable working conditions, such as an underwater installation; the combination of:
- a body provided with an opening having an axis,
- a rotatable collar means having a through bore to receive a pipe end,
- said rotatable collar means including end portions and a recess therebetween defining a neck portion and providing spaced abutment surfaces,
- one of said end portions having internal threads for engagement with threads on said pipe end,
- a connector positioning means extending from said body having a recess opening laterally with relation to the axis of the body opening to loosely receive the neck portion of the collar means for receiving a pipe end in misalignment with the axis of said body opening,
- said one end portion having an end surface spaced from the proximate abutment surface and engageable with the body for longitudinal positioning of the rotatable collar means relative to said body,
- the other of said end portions having external threads for cooperable engagement with a drive means.

References Cited

UNITED STATES PATENTS

| | | | |
|---|---|---|---|
| 1,831,956 | 11/1931 | Harrington | 285—357 X |
| 1,874,918 | 8/1932 | Davis | 285—325 X |
| 2,350,017 | 5/1944 | Davis | 285—357 X |
| 2,590,688 | 3/1952 | Crain | 285—32 X |

FOREIGN PATENTS

| | | |
|---|---|---|
| 1,042,329 | 10/1958 | Germany. |
| 316,168 | 7/1929 | Great Britain. |

DAVID J. WILLIAMOWSKY, Primary Examiner

D. W. AROLA, Assistant Examiner

U.S. Cl. X.R.

166—85; 285—189, 325, 357